E. W. MILLER.
ELECTRIC CONTROLLING MECHANISM FOR WASHING MACHINES.
APPLICATION FILED JAN. 25, 1916.

1,264,956.

Patented May 7, 1918.
5 SHEETS—SHEET 1.

WITNESSES:
H. E. Stonebraker
Nelson H. Copp

INVENTOR
Ernest W. Miller
BY
his ATTORNEYS

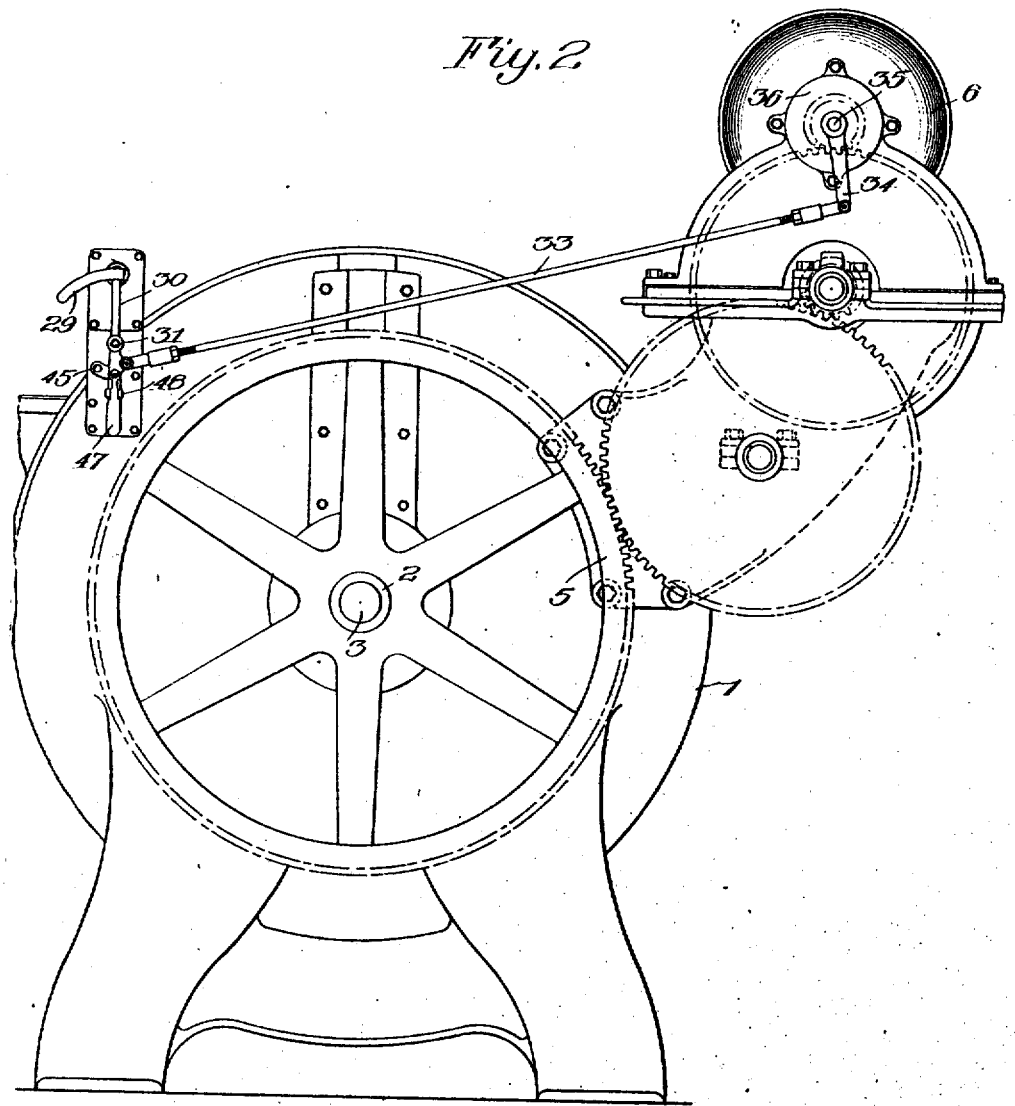

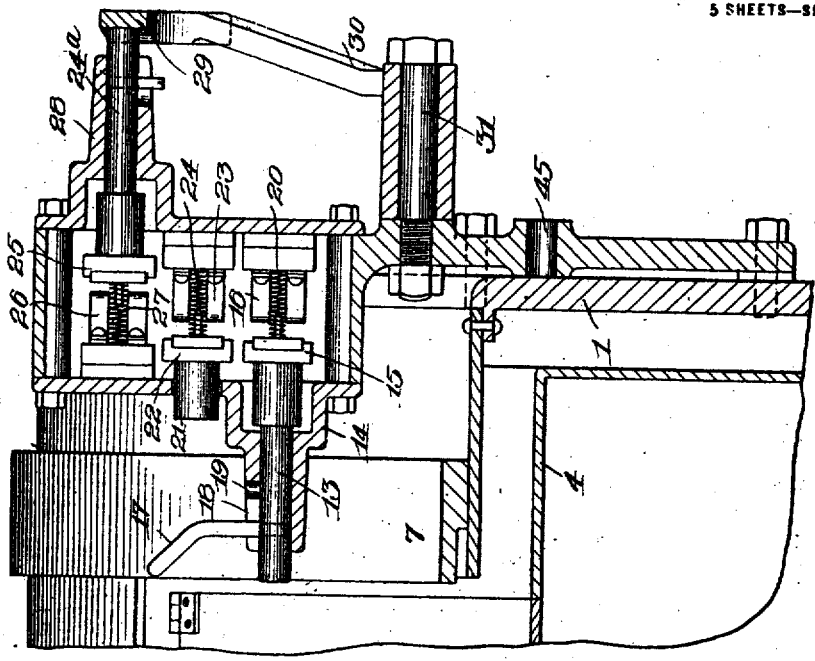

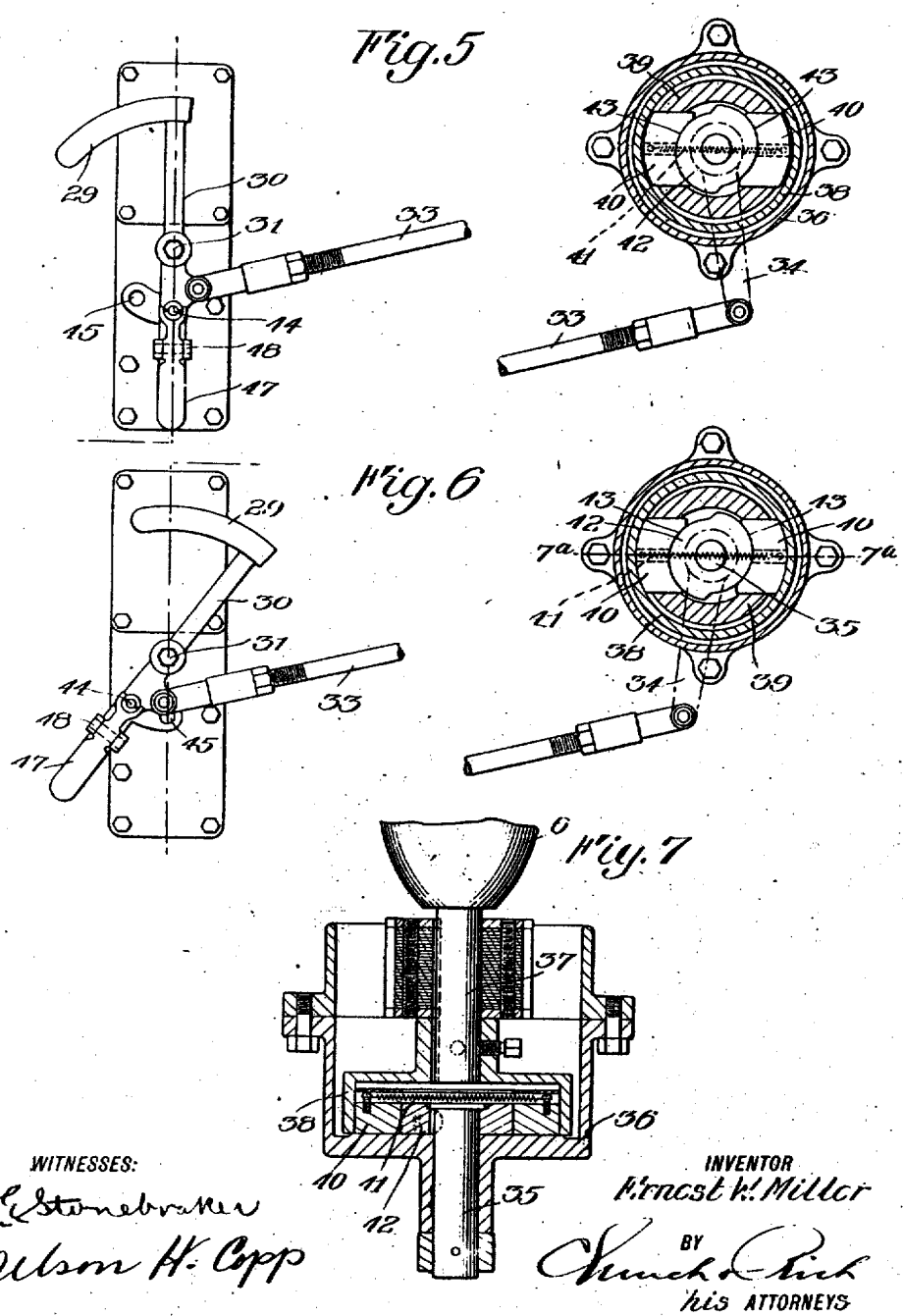

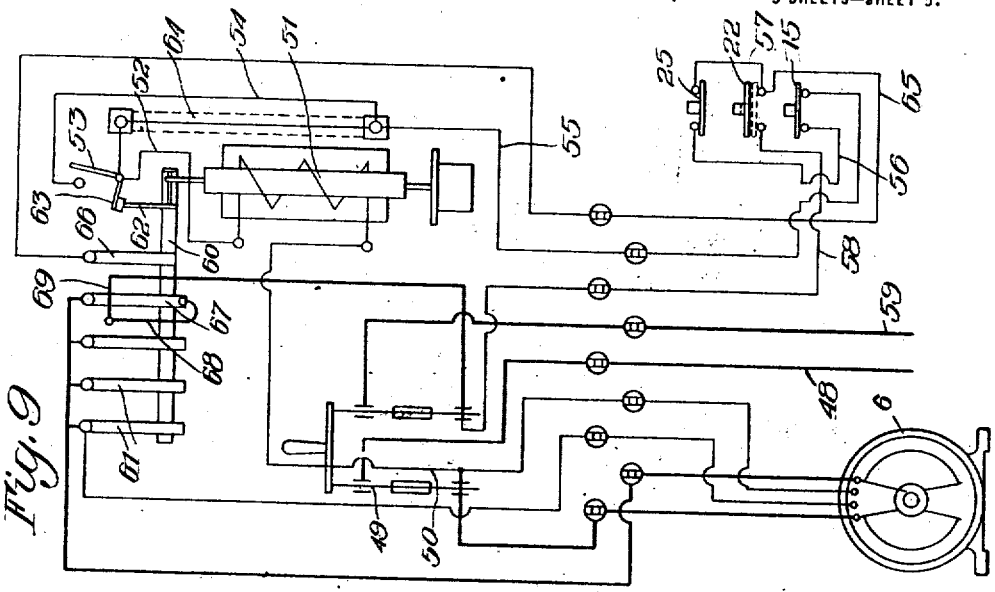

UNITED STATES PATENT OFFICE.

ERNEST W. MILLER, OF NORWOOD, OHIO, ASSIGNOR TO THE AMERICAN LAUNDRY MACHINERY COMPANY, OF CINCINNATI, OHIO, A CORPORATION OF OHIO.

ELECTRIC CONTROLLING MECHANISM FOR WASHING-MACHINES.

1,264,956.    Specification of Letters Patent.    Patented May 7, 1918.

Application filed January 25, 1916. Serial No. 74,101.

*To all whom it may concern:*

Be it known that I, ERNEST W. MILLER, a subject of the King of Sweden, residing at Norwood, county of Hamilton, and State of Ohio, have invented certain new and useful Improvements in Electric Controlling Mechanism for Washing-Machines; and I do hereby declare the following to be a full, clear, and exact description of the same, reference being had to the accompanying drawings, forming a part of this specification, and to the reference-numerals marked thereon.

My invention has for its object to provide an effective controlling mechanism that is adapted for use in connection with apparatus like washing machines, of a type embodying a casing or receptacle for containing water or other liquid with which the goods are to be treated, which latter are disposed within a container that is rotatively arranged within the receptacle, and it is the chief purpose of the present improvement to subject said container to the control of an interlocking mechanism whereby it can not be driven except under certain predetermined conditions, thus insuring complete safety of the operator as well as a proper operation of the mechanism. In a more particular aspect, it is contemplated within the present invention to operate the container by an electric motor, and to furnish the power to the motor through automatic switch mechanism that requires closing the door or doors in the receptacle and also releasing a brake mechanism before the motor circuit can be closed, and further in the provision of means whereby said circuit is automatically opened to cut off the motor whenever the brake mechanism is applied or whenever the door in the receptacle is moved away from its closed position. An additional feature of the invention is to be found in the simplicity of the operation and the extreme readiness with which the parts can be controlled when stopping the machine, so as to bring the container to rest at exactly the proper point, with the door of the container in substantial coincidence with the door of the receptacle for the purpose of permitting access to the interior of the container through the receptacle when inserting or removing a supply of goods. To these and other ends the invention consists in certain improvements and combinations of parts, all as will be hereinafter more fully described the novel features being pointed out in the claims at the end of the specification.

In the drawings:

Fig. 2 is an end elevation;

Fig. 3 is an enlarged sectional view of the switch mechanism, showing the door controlled switch and the brake operated switches both closed, or in such position as to permit the motor circuit to be closed;

Fig. 4 is a similar view showing all the switches open;

Fig. 5 is an enlarged elevation of the brake controlling lever with the brake mechanism appearing in section and in released position;

Fig. 6 is a similar view with the brake applied for stopping the motor;

Fig. 7 is a sectional view on line 7ª—7ª of Fig. 6;

Fig. 8 is a diagrammatic view of the arrangement of circuits controlling the motor, and with the door controlled switch and brake operated switches both closed, preparatory to closing the motor circuit, and Fig. 9 is a similar view showing the position of the parts after the motor circuit is closed and with the motor in operation.

Similar reference characters throughout the several views indicate the same parts.

Figure 1:
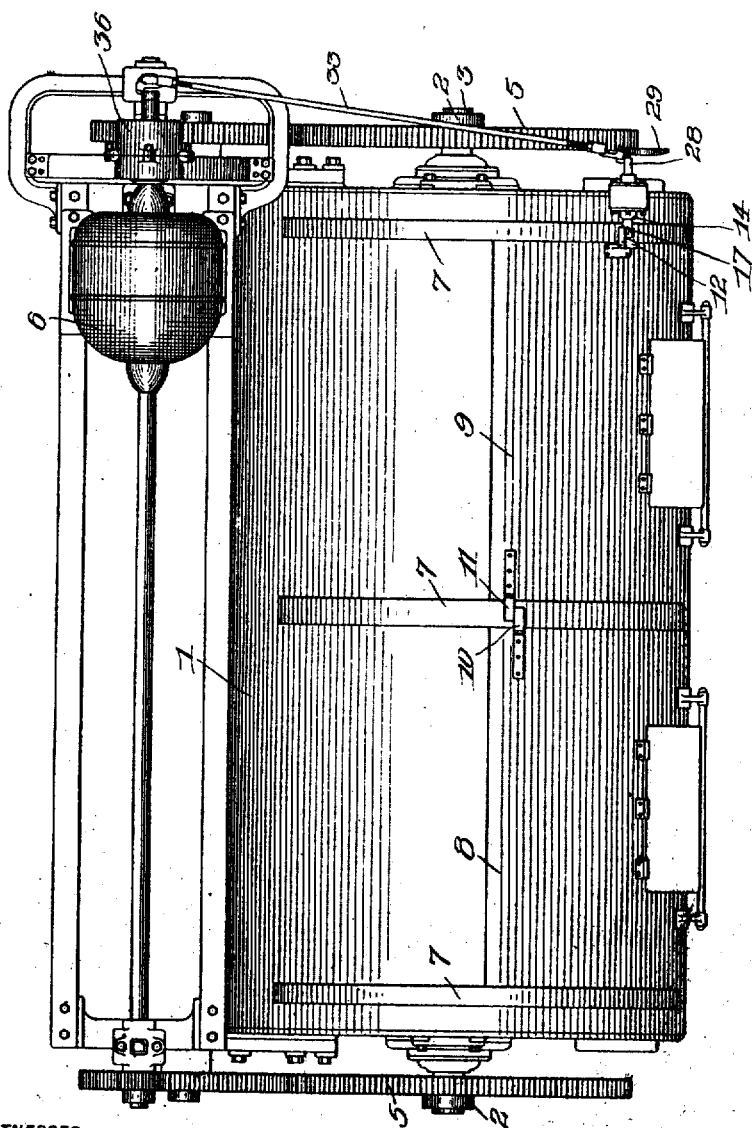
Figure 1 is a plan view of a usual type of washing machine showing the manner in which the present improvement may be applied.

The present arrangement is intended merely for purposes of illustration as a possible method of carrying out the invention, which may at the same time, be otherwise applied to any type of apparatus that includes a container movable within a normally closed receptacle or housing, making it desirable to lock the container against movement except under certain predetermined conditions. The structure shown is that of a usual type of washing machine such as employed in laundrying and allied trades, and comprises a frame on which is supported a liquid receptacle or housing 1 provided with journals 2 to receive a rotary shaft 3 that carries a container 4 usually of perforate construction and arranged for rotation interiorly of the receptacle. The shaft 3 carries gear wheels 5 that are driven through suitable gearing from an electric motor 6 which is controlled as will be more fully described presently.

The receptacle 1 is provided with guides 7 within which are movable the sliding doors 8 and 9 provided with coöperating projections 10 and 11 which insure closing the door 8 before door 9 can be moved to its closed position as will be seen from Fig. 1. The door 9 carries a cam projection 12 arranged to engage a switch rod 13 movable in a guide 14 and carrying the switch 15 which coöperates with contact 16 of the motor circuit. The switch rod 13 also carries a handle 17 that is movable in the slot 18 and arranged to engage a recess 19 for a purpose that will presently appear more fully and it will be seen from this arrangement that upon closing the doors 8 and 9 the switch 15 is automatically closed and upon opening said doors, the switch is automatically opened by the spring 20 although it may be moved to closed position when the doors are open, by operating handle 17. 21 is a manually controlled switch button carrying switch 22 which coöperates with contacts 23, and is held normally in open position by a spring 24. The contacts 23 are also a part of the motor circuit which will be described later. 24ᵃ is a switch rod provided with a switch 25 coöperating with contacts 26 and held normally in the position shown in Fig. 4 by the spring 27. The switch rod 24ᵃ is movable in the guide 28 and is controlled by a cam 29 which is mounted upon an operating lever 30 journaled on the bearing 31 and having a handle 32. The operating lever 30 has pivoted thereto a connecting rod 33, that leads to a link 34, fixed to a stub shaft 35, which is arranged in a housing 36, as shown in Figs. 5 to 7 inclusive, and forming part of the brake mechanism that controls the motor 6. The motor shaft is designated by 37 and has fixed thereon a drum 38. Arranged within said drum is a housing 39 having openings to receive a plurality of brake members or shoes 40 which engage the inner surface of the drum 38 and are held in normal or released position by a spring 41 connecting them, or any other suitable means. The stub shaft 35 carries a cam member 42 provided with eccentric surfaces 43 which are disposed for engagement with coöperating surfaces on the brake members 40. Thus when the cam member 42 is turned in one direction it forces the brake shoes outwardly, radially of the drum so that they engage the inner surface of the drum, bringing the motor shaft to a stop, and when said cam member is moved in the opposite direction the brake members are released and moved inwardly of the drum, away from its braking surface through the action of spring 41. The operation of the brake is effected by the lever 30, as already described, through the connecting rod 33, and when the brake members are applied, the parts are in the position shown in Fig. 6, where cam 29 is moved so as to release switch 25, and when the brake members are released, the parts are in the position shown in Fig. 5, the cam 29 having moved to close switch 25 as shown in Fig. 3. The brake controlling lever 30 carries a locking pin 44 arranged to engage either of the openings 45 in the frame and actuated by a spring 46, while 47 is a lever connected to the pin 44 and by which it may be moved out of engagement with either one of the openings 45 when it is desired to shift the brake lever from one position to the other. The lever 47 is mounted upon brake lever 30 on the bearing 48. With the parts thus far described arranged and operating as indicated, it is necessary that switches 15 and 25 both be closed before current can be supplied to the motor, which is effected by the additional operation of closing switch 22, and I will now proceed to describe the arrangement of electric circuits by which this result is accomplished.

Referring to Figs. 8 and 9, switches 15 and 25 are shown in closed position, which they assume after the doors are closed and the brake is released, preparatory to starting the apparatus. With the parts in this position, the circuit is broken at switch 22, and the motor can not be operated until the switch 22 is closed, this being the final operation in starting the machine. As soon as this is done, current passes from the main supply conductor 48 through the line switch 49 to conductor 50, thence through magnetic coil 51, conductor 52, switch 53, and conductors 54 and 55 to the switch 15. The current is then carried through conductor 56 and switch 25 to conductor 57, from which it passes through switch 22, as shown in dotted lines in Fig. 9, and conductor 58 to switch 49, and to the main supply conductor 59. The circuits leading to the field and armature of the motor involve no novelty, and it is sufficient for the purposes of the present invention that the motor circuit is thus closed. At the same time, the magnetic coil 51 being energized causes a movement of a pivoted switch arm 60 which carries a series of controlling switches 61, and also an arm 62 that engages a tail piece 63 upon switch 53, moving the latter to the position shown in Fig. 9. This causes the current to travel through a resistance element 64, instead of through conductor 54. In the initial operation, full voltage is required to energize the magnetic coil 51, so as to throw over the switch arm 60, but after it is once moved to this position, the current passing through resistance 64 will energize the magnetic coil sufficiently to hold the switch arm 60 in operating position. With the parts thus arranged, as shown in Fig. 9, and after switch 22 is released, the current travels from conductor 48 as already described up to switch 53. Thence it passes through resistance 64 and conductor 55 to the switch 15. From here, it is conducted to switch 25, and thence through conductor 57 to conductor 65 which leads to switch 66. The current then passes into switch arm 60 and thence through switch 67 to a flexible conductor 68 leading to a stationary conductor 69. The latter carries the current back to the line switch 49 and to the other side 59 of the line. Thus when the switches 15 and 25 are closed as shown in Fig. 8, the motor is started by momentarily closing switch 22, and the motor circuit thereafter remains closed as long as switches 15 and 25 are held in closed position. Upon the opening of either one of these switches however, as by applying the brake mechanism or by opening the doors to the receptacle, the motor circuit is immediately broken.

To start the apparatus the doors are closed, moving switch 15 to its closed position. The brake mechanism is released, moving switch 25 to its closed position, after which switch 22 is closed by the operator for a sufficient length of time to energize the magnetic coil 51 and throw over the switch arm 60. When the motor is stopped, it is desirable that the container within the receptacle be brought to a standstill in a certain relation with the receptacle so that the doors of the latter and the doors of the container are coincidently disposed. For this purpose it is sometimes necessary that the container be given a slight additional movement after the receptacle doors are opened. This is accomplished in the present apparatus by moving the handle 17 on switch rod 13 into engagement with the recess 19, which holds the switch 15 closed. The operator then holds switch button 21 in to close the switch 22, and while holding the switch 22 in closed position, the brake lever is operated back and forth intermittently until the container is brought to exactly the position desired. It will be apparent that when the switches 15 and 22 are closed, upon releasing the brake mechanism the motor circuit is closed and upon applying the brake mechanism, the motor circuit is opened so that the result mentioned can be obtained without any difficulty by operating the brake lever back and forth, to alternately apply and release the brake mechanism, while the operator can watch the container and observe when it has reached the proper position.

It will be understood that the invention is not confined to the particular mechanism or to the precise arrangement of circuits herein shown and described and the present application is designed to cover any mechanism having equivalent elements for carrying out the purposes set forth, and coming within the terms of the claims hereto appended.

I claim as my invention:

1. The combination with a receptacle, of a container rotatively arranged within the receptacle, an electric motor for driving said container, a motor circuit therefor, a movable door arranged in the receptacle to permit access to said container, a brake for the motor, and means controlled by the door and brake for opening said circuit when the door is opened or the brake is applied.

2. The combination with a receptacle, of a container rotatively arranged within the receptacle, an electric motor for driving said container, a motor circuit therefor, a movable door arranged in the receptacle to permit access to the container, a brake for the motor, means controlled by the door and the brake for requiring said door to be closed and the brake to be released before the motor circuit can be closed.

3. The combination with a receptacle, of a container rotatively arranged within the receptacle, an electric motor for driving said container, a motor circuit therefor, a movable door arranged in the receptacle to permit access to the container, a brake for the motor, means controlled by the door and the brake for requiring said door to be closed and the brake to be released before said motor circuit can be closed and automatically opening said circuit when the door is opened or the brake is applied.

4. The combination with a receptacle, of a container rotatively arranged within the receptacle, a door in the receptacle for permitting access to the container, an electric motor for driving said container, a motor circuit therefor, a brake coöperating with said motor, a brake operated switch that closes when the brake is released, a door controlled switch which closes when the door is closed, and a manual switch that must be closed to supply current to the motor.

ERNEST W. MILLER.

Witnesses:
ALBERT J. DREHER,
JOS. H. SPELLER.